US010371790B2

(12) United States Patent
Han

(10) Patent No.: US 10,371,790 B2
(45) Date of Patent: Aug. 6, 2019

(54) CALIBRATION-FREE LOCATION DETERMINATION USING WIRELESS COMMUNICATION

(71) Applicant: Ruckus Wireless, Inc., Sunnyvale, CA (US)

(72) Inventor: Yang Han, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 156 days.

(21) Appl. No.: 15/534,486

(22) PCT Filed: Dec. 12, 2014

(86) PCT No.: PCT/US2014/070015
§ 371 (c)(1),
(2) Date: Jun. 9, 2017

(87) PCT Pub. No.: WO2016/093860
PCT Pub. Date: Jun. 16, 2016

(65) Prior Publication Data
US 2017/0336494 A1    Nov. 23, 2017

(51) Int. Cl.
*G01S 5/14* (2006.01)
*G01S 11/06* (2006.01)
*G01S 5/30* (2006.01)

(52) U.S. Cl.
CPC .................. *G01S 5/14* (2013.01); *G01S 5/30* (2013.01); *G01S 11/06* (2013.01)

(58) Field of Classification Search
CPC ..... H04W 64/00; H04W 64/003; H04W 4/04; H04W 64/006; H04W 4/029; H04W 4/33;
(Continued)

(56) References Cited

U.S. PATENT DOCUMENTS 7,205,938 B2    4/2007  Davi et al. ................. 342/451
7,835,749 B1    11/2010 Hart et al. .................. 455/446
(Continued)

OTHER PUBLICATIONS

International Search Report and Written Opinion for PCT/US2014/070015, Aug. 28, 2015.

*Primary Examiner* — Kwasi Karikari
(74) *Attorney, Agent, or Firm* — Stewart M. Wiener; Steven E. Stupp

(57) ABSTRACT

In order to accurately determine the location of an electronic device in an environment, a computer selects a set of received-signal-strength (RSS) values based on wireless communication between the electronic device and access points in sub-regions of the environment. This set includes a largest RSS value associated with a sub-region and at least two RSS values associated with neighboring sub-regions. Then, the computer calculates pairwise distance estimates of the location of the electronic device in the environment based on predefined locations of the access points associated with the set, one or more differences of pairs of RSS values in the set and a predetermined path-loss factor in the environment, where a given pair of RSS values includes the largest RSS value and one of the at least two RSS values. Furthermore, the computer determines the location of the electronic device in the environment based on the pairwise distance estimates.

22 Claims, 9 Drawing Sheets

(58) Field of Classification Search
CPC ....... H04W 4/023; H04W 16/14; H04W 4/02; H04W 84/12; H04W 4/80; H04W 40/244; H04W 88/02; H04W 88/08; H04W 8/005; H04W 40/20; H04W 52/242; H04W 36/32; H04W 4/025; H04W 4/027; H04W 52/245; H04W 16/20; H04W 16/24
See application file for complete search history.

(56) References Cited

U.S. PATENT DOCUMENTS

| | | | |
|---|---|---|---|
| 8,965,411 B1 * | 2/2015 | Busch-Sorensen | G01S 5/14 455/456.3 |
| 2005/0208952 A1 | 9/2005 | Dietrich et al. | 455/456.1 |
| 2013/0079027 A1 | 3/2013 | Hand et al. | 455/456.1 |
| 2013/0260782 A1 * | 10/2013 | Un | H04W 64/00 455/456.1 |
| 2014/0243016 A1 | 8/2014 | Denis et al. | 455/456.1 |

* cited by examiner

DATA STRUCTURE 600

| OM | |
|---|---|
| MAC | RSS VALUES |
| MAC1 | RSS1 |
| MAC2 | RSS2 |
| MAC3 | RSS3 |
| ⋮ | |
| MACi | RSSi |

FIG. 6

CALIBRATION-FREE LOCATION DETERMINATION USING WIRELESS COMMUNICATION

CROSS REFERENCE TO RELATED APPLICATIONS

This application claims priority under 35 U.S.C. 371 to International Application No. PCT/US2014/070015, "Calibration-Free Location Determination Using Wireless Communication," by Yang Han, filed on Dec. 12, 2014, the contents of which are herein incorporated by reference.

BACKGROUND

Field

The described embodiments relate to techniques for determining the location of an electronic device. In particular, the described embodiments relate to techniques for determining the location of an electronic device based on wireless communication between a location system and the electronic device without having to calibrate the location system.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash., which is sometimes referred to as 'Wi-Fi'), and/or another type of wireless network.

The rapid evolution of portable electronic devices has created tremendous demand for location-based services (LBSs) that make use of wireless communication capabilities to determine the location of wireless electronic devices. For example, the prevalence of Wi-Fi makes it a good candidate solution for implementing an LBS. A Wi-Fi positioning system usually provides position information for portable electronic devices within a coverage area leveraging existing Wi-Fi infrastructure. In particular, many attributes of Wi-Fi signals can be used to determine position based on triangulation techniques. These attributes may include: the angle of arrival (AOA), the time of arrival (TOA), and the time difference of arrival (TDOA), etc. However, the performance of triangulation techniques based on these attributes is typically very sensitive to multi-path and non-line-of-sight effects, which are very common in urban and indoor environments. In addition, these triangulation techniques often have special hardware requirements and high computational complexity. Consequently, triangulation techniques are often less attractive for practical deployments.

In contrast to the triangulation techniques, positioning techniques, such as those based on radio fingerprinting, exploit the relationship between the received signal strength (RSS) and a specific location. In particular, each physical location within a coverage area may be mapped into a unique vector in the signal space of RSS (i.e., the RSS or radio 'fingerprint') during an offline-calibration phase. Subsequently, during the online-positioning phase, RSS vectors collected in real time are compared with the RSS vectors collected during the offline-calibration phase. Then, a probabilistic model is usually applied to calculate the position estimate.

While radio-fingerprinting techniques can solve many of the drawbacks of the triangulation technique, they do present some problems. One challenge is the laborious calibration. In order to achieve good positioning accuracy, RSS fingerprints typically need to be collected with reasonably small granularity within the coverage area. This calibration often prolongs the deployment process and increases the deployment cost. Moreover, the radio-fingerprinting techniques are usually sensitive to device variance. In particular, because of different hardware designs, RSS vectors collected for different portable electronic devices can be drastically distinct from each other even if they are physically located at the same position. Consequently, the positioning accuracy is often degraded when different portable electronic devices are used for offline calibration and for online positioning.

Furthermore, radio-fingerprinting techniques usually have high computational complexity for large scale deployments. When the coverage area becomes large, the number of physical locations (i.e., the number of calibration points) where RSS signal vectors that need to be collected becomes large, and this often results in higher computational complexity in the position calculations.

SUMMARY

The described embodiments relate to a computer that includes: an interface circuit that communicates with access points via a network, a processor, and memory that stores a program module that is executed by the processor. During operation, the computer receives, from the access points in sub-regions of an environment, received-signal-strength (RSS) values based on wireless communication between the access points and an electronic device in the environment. Then, the computer selects a subset of the RSS values from a subset of the access points, where the subset of the RSS values includes a largest RSS value associated with a sub-region and at least N RSS values associated with neighboring sub-regions. Moreover, the computer calculates pairwise distance estimates of a location of the electronic device in the environment based on predefined locations of the subset of the access points, one or more differences of pairs of RSS values in the subset of the RSS values and a predetermined path-loss factor in the environment, where a given pair of RSS values includes the largest RSS value and one of the at least N RSS values. Furthermore, the computer determines the location of the electronic device in the environment based on the pairwise distance estimates.

Note that each sub-region may include one of the access points. For example, the sub-regions may include Voronoi cells, and a given access point may be located at a center of a given Voronoi cell. In some embodiments, the computer sub-divides the environment into the sub-regions.

Moreover, the number N may be two.

Furthermore, the environment may include a building, and the selecting operation may involve identifying access points that are located on a common floor in the building.

Additionally, determining the location of the electronic device may involve a regression technique and a set of equations that include the pairwise distance estimates, the predefined locations, parameters corresponding to the one or more differences of the pairs of RSS values and the predetermined path-loss factor.

In some embodiments, the location of the electronic device is determined without calibration for coverage of the access points in the environment and/or access-point variability.

Note that the access points may communicate with the electronic device using wireless communication via a common channel.

Moreover, a difference between the largest RSS value and a given one of at least the N RSS values may be less than a threshold value.

Furthermore, a computation complexity of the determination of the location of the electronic device may be independent of a size of the environment and coverage of the access points in the environment.

In some embodiments, during operation the computer determines the location of the electronic device in the environment based on the pairwise distance estimates that are calculated using the predefined locations of access points in the environment, the one or more differences of pairs of RSS values from the access points and the predetermined path-loss factor in the environment, where the RSS values are based on wireless communication between the access points and the electronic device.

Another embodiment provides a computer-program product for use with the computer described previously. This computer-program product includes instructions for at least some of the operations performed by the computer.

Another embodiment provides a method for determining the location of the electronic device in the environment described previously. This method includes at least some of the operations performed by the computer.

This Summary is provided merely for purposes of reviewing some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIG. 6 is a block diagram illustrating a data structure that stores an observation metric in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In order to accurately determine the location of an electronic device in an environment, a computer selects a set of received-signal-strength (RSS) values based on wireless communication between the electronic device and access points in sub-regions of the environment. This set includes a largest RSS value associated with a sub-region and at least two RSS values associated with neighboring sub-regions. Then, the computer calculates pairwise distance estimates of the location of the electronic device in the environment based on predefined locations of the access points associated with the set, one or more differences of pairs of RSS values in the set and a predetermined path-loss factor in the environment, where a given pair of RSS values includes the largest RSS value and one of the at least two RSS values. Furthermore, the computer determines the location of the electronic device in the environment based on the pairwise distance estimates.

The location-determination technique allows the location to be determined without calibration. In particular, the location can be determined without radio or RSS fingerprinting. In addition, the computational complexity of the determination of the location of the electronic device in the location-determination technique may be independent of a size of the environment and coverage of the access points in the environment. Consequently, the location-determination technique may significantly reduce the time, complexity and expense of deploying the location-determination technique in the environment.

In the discussion that follows, the electronic device may include a radio that communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols may be used.

Figure 1:
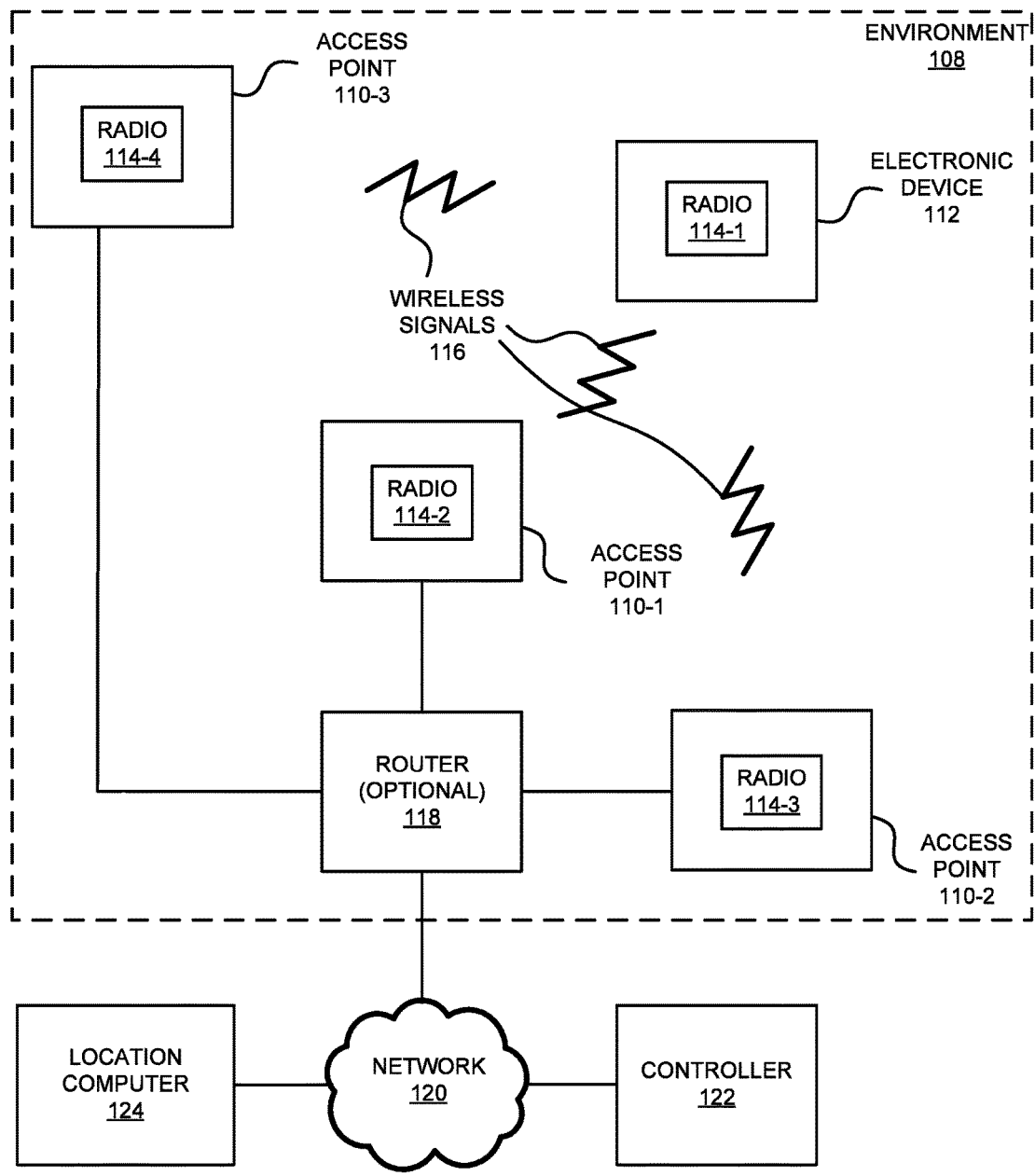
FIG. 1 is a block diagram illustrating electronic devices wirelessly communicating in accordance with an embodiment of the present disclosure.

Communication among electronic devices is shown in FIG. 1, which presents a block diagram illustrating access points 110 and electronic device 112 (such as a portable electronic device, e.g., a cellular telephone or a smartphone) wirelessly communicating in an environment 108 according to some embodiments. In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads).

Figure 9:
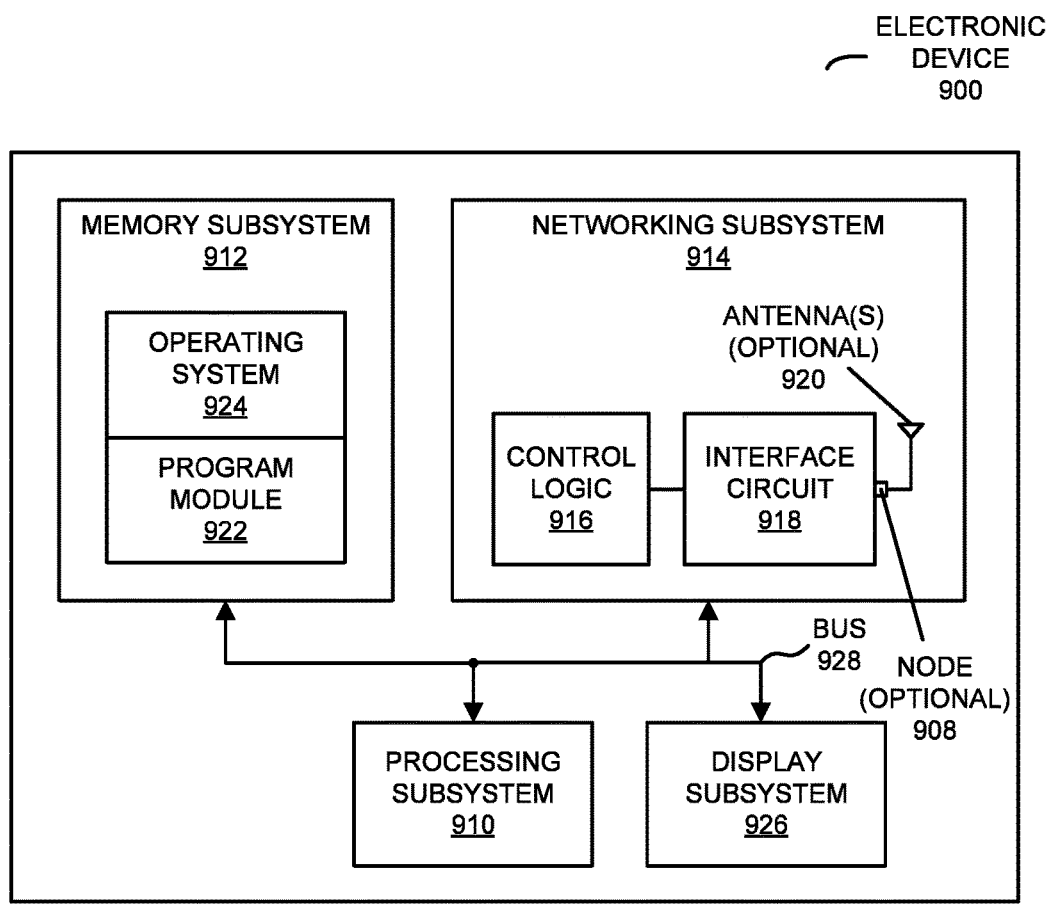
FIG. 9 is a block diagram illustrating one of the electronic devices of FIG. 1 in accordance with an embodiment of the present disclosure.

As described further below with reference to FIG. 9, access points 110 and electronic device 112 may include subsystems, such as a networking subsystem, a memory subsystem and a processor subsystem. In addition, access points 110 and electronic device 112 may include radios 114 in the networking subsystems. More generally, access points 110 and electronic device 112 can include (or can be included within) any electronic devices with the networking subsystems that enable access points 110 and electronic device 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 114 are shown in access points 110 and electronic device 112, one or more of these instances may be different from the other instances of radios 114.

As can be seen in FIG. 1, wireless signals 116 (represented by jagged lines) are transmitted from radio 114-1 in electronic device 112. These wireless signals 116 are received by radios 114 in access points 110. In particular, electronic device 112 may transmit packets. In turn, these packets may be received by at least a subset of access points 110. Consequently, access points 110 may receive wireless signals 116 in a common channel during the wireless communication by electronic device 112. As described further below, information characterizing the wireless communication with electronic device 112 may be provided by at least the subset of access points 110 to location computer 124 via optional router 118 and network 120, which may allow location computer 124 to determine the location of electronic device 112. Note that the communication between at least the subset of access points 110 (such as access point 110-1) and electronic device 112 may be characterized by a variety of performance metrics, such as: a received signal strength (RSS), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). In addition, note that, in order to use access points 110, access points 110 may need to be configured (such as for security purposes) when they are first installed at a particular location (which is sometimes referred to as a 'user location'). This configuration may include communication with controller 122 via optional router 118 and network 120 (such as the Internet).

As discussed further below with reference to FIGS. 2-8, in the disclosed location-determination technique location computer 124 may determine the location of electronic device 112. In particular, after receiving RSS values from access points 110, location computer 124 may select a subset of the RSS values from a subset of access points 110. For example, as described below with reference to FIG. 4, access points 110 may be associated with sub-regions in environment 108, and each of the sub-regions may include one of access points 110. (In some embodiments, the sub-regions include Voronoi cells, and a given access point may be located at a center of a given Voronoi cell. Additionally, location computer 124 may sub-divide environment 108 into the sub-regions.) Moreover, the selected subset of the RSS values may include a largest RSS value from an access point in a sub-region and at least N RSS values (such as two RSS values) from access points in neighboring sub-regions.

Note that a difference between the largest RSS value and a given one of at least the N RSS values may be less than a threshold value (such as 5 dB). In practical environments, a neighboring access point may have significantly lower RSS values than those of the main access point because of obstructions, such as walls, pillars, partitions, etc. In these cases, the usual log-normal distribution of RSS values may not be valid, and using the RSS values from such a neighboring access point to determine the location may degrade the accuracy. Consequently, the threshold value (e.g., 5 dB) may be used to exclude these access points (even if they are neighbors to the main access point) from the subsequent location calculations. In addition, note that N defines the minimum number of pair-wise calculations that is needed to determine the location of electronic device 112. As described further below, in other words N is the minimum number of equations (such as Eqns. 4 and 5) that are needed to generate a unique location (x, y). Because each of these equations defines a circle, at least three such equations are needed to uniquely pinpoint a location on a two-dimensional plane. In general, when the number of RSS values used to determine the location (N+1) is smaller than three, the problem is under-determined. However, by combining information about an indoor environment (e.g., a venue boundary, an accessible area, etc.), it may still be possible in these cases to determine the location without ambiguity. Alternatively, when the number of RSS values used to determine the location (N+1) is larger than three, the problem is over-determined. In these embodiments, a regression technique (such as minimum mean square error) may be used to determine the location of electronic device 112.

Then, location computer 124 may calculate pairwise distance estimates of the location of electronic device 112 in environment 108 based on predefined locations of the subset of access points 110, one or more differences of pairs of RSS values in the subset of the RSS values and a predetermined path-loss factor in environment 108. Note that a given pair of RSS values includes the largest RSS value and one of the at least N RSS values. Furthermore, location computer 124 may determine the location of electronic device 112 in environment 108 based on the pairwise distance estimates. For example, determining the location of electronic device 112 may involve a regression technique and a set of equations that include the pairwise distance estimates, the predefined locations, parameters corresponding to the one or more differences of the pairs of RSS values and the predetermined path-loss factor.

Figure 8:
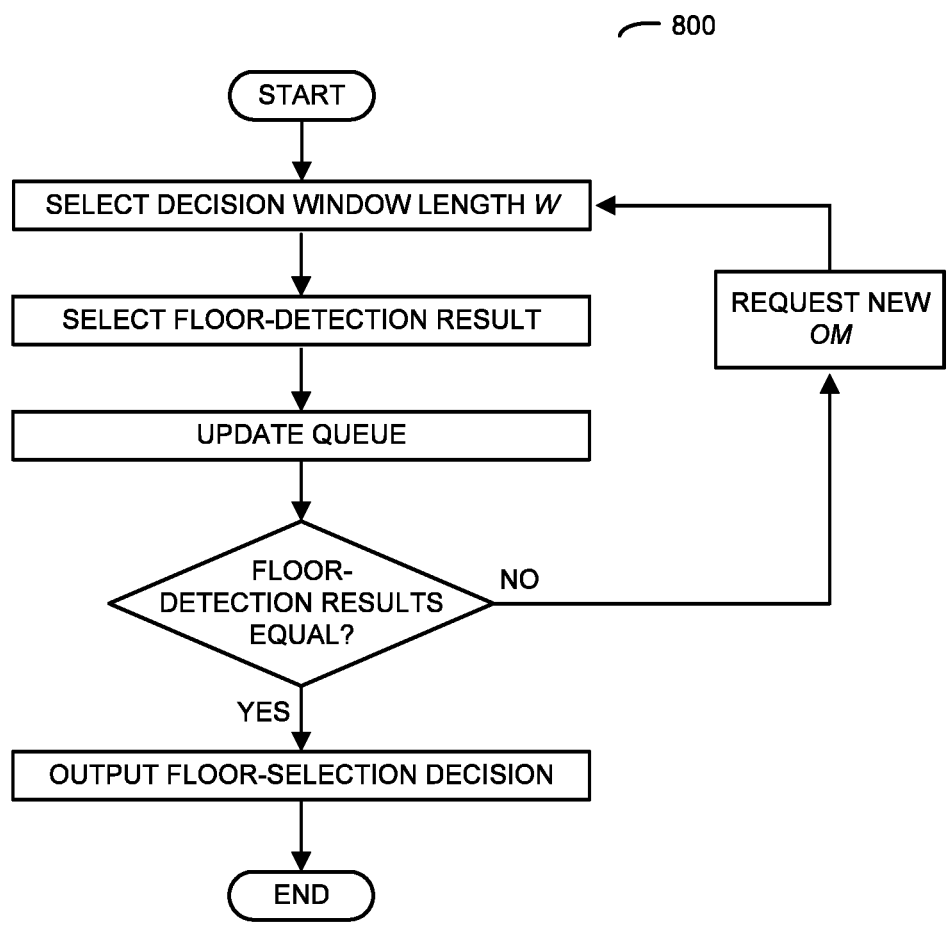
FIG. 8 is a flow diagram illustrating a method for determining a floor that contains the electronic device in FIG. 1 in accordance with an embodiment of the present disclosure.

As described below with reference to FIG. 8, in some embodiments environment 108 includes a building, and the selecting operation may involve identifying access points that are located on a common floor in the building.

By determining the location based on one or more differences of pairs of RSS values, the location of electronic device 112 may be determined without calibration for coverage of access points 110 in environment 108 and/or access-point variability. Furthermore, a computation complexity of the determination of the location of electronic device 112 may be independent of a size of environment 108 and coverage of access points 110 in environment 108.

In the described embodiments, processing a packet or frame in access points 110 and/or electronic device 112 includes: receiving wireless signals 116 with the packet or frame; decoding/extracting the packet or frame from received wireless signals 116 to acquire the packet or frame; and processing the packet or frame to determine information contained in the packet or frame (such as feedback about the performance during the communication).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
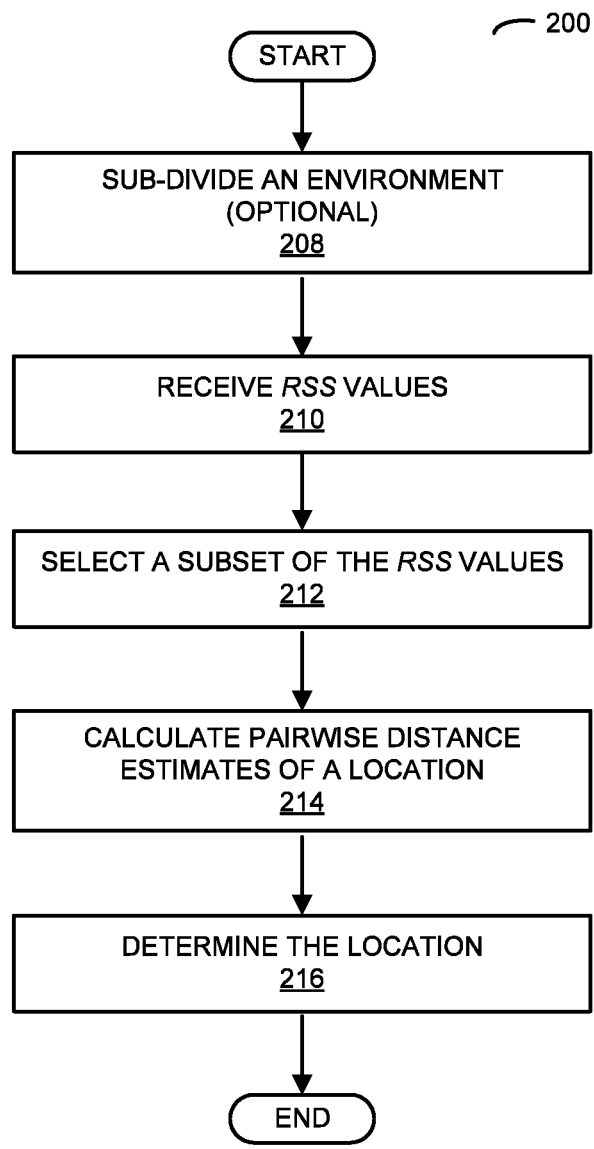
FIG. 2 is a flow diagram illustrating a method for determining a location of an electronic device in FIG. 1 in accordance with an embodiment of the present disclosure.

FIG. 2 presents embodiments of a flow diagram illustrating method 200 for determining the location of the electronic device (such as electronic device 112 in FIG. 1) in the environment, which may be performed by a computer (such as location computer 124 in FIG. 1). During operation, the computer receives, from access points in sub-regions of an environment, RSS values (operation 210) based on wireless communication between the access points and an electronic device in the environment. Then, the computer selects a subset of the RSS values (operation 212) from a subset of the access points, where the subset of the RSS values includes a largest RSS value associated with a sub-region and at least N RSS values associated with neighboring sub-regions.

Moreover, the computer calculates pairwise distance estimates of a location (operation 214) of the electronic device in the environment based on predefined locations of the subset of the access points, one or more differences of pairs of RSS values in the subset of the RSS values and a predetermined path-loss factor in the environment (which may be between one and four or one and ten), where a given pair of RSS values includes a largest RSS value and one of the at least N RSS values. Next, the computer determines the location (operation 216) of the electronic device in the environment based on the pairwise distance estimates.

In these ways, the computer (for example, software executed in an operating environment of the computer) may determine the location of the electronic device.

In some embodiments of method 200 (FIG. 2), there may be additional or fewer operations. For example, the computer may optionally sub-divide the environment (operation 208) into the sub-regions. Alternatively or additionally, the determined location may be provided to the electronic device and/or a third party that leverages the location information to provide an additional service (such as providing a discount or an advertisement to the electronic device). Moreover, the order of the operations may be changed, and/or two or more operations may be combined into a single operation.

Figure 3:
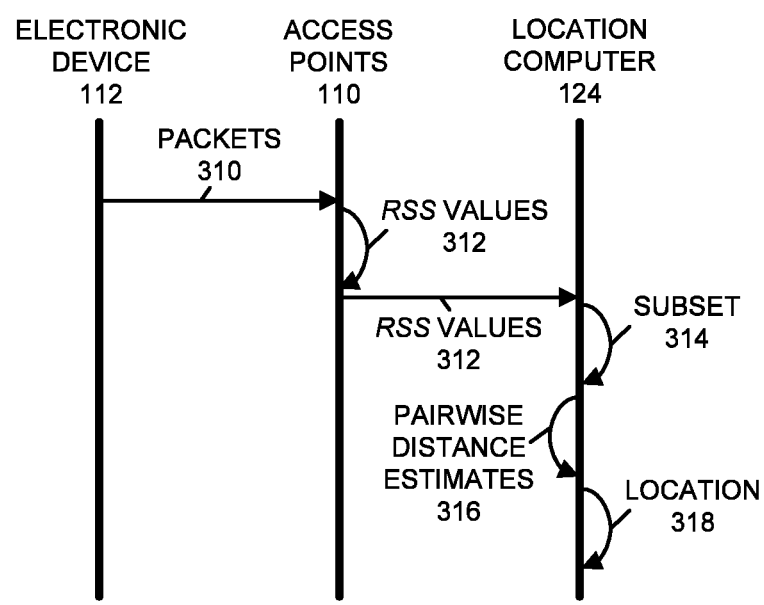
FIG. 3 is a drawing illustrating communication among the electronic devices in FIG. 1 in accordance with an embodiment of the present disclosure.

Embodiments of the location-determination technique are further illustrated in FIG. 3, which presents a drawing illustrating communication between access points 110, electronic device 112 and location computer 124 according to some embodiments. In particular, electronic device 112 wireless communicates packets 310 with access points 110. Then, access points 110 measure RSS values 312 associated with the wireless communication. Note that the location is determined in the location-determination technique using RSS values. In principle, all kinds of packets can be used in this regard (including control packets, management packets, data packets, etc.), as long as an RSS value can be extracted from each of these packets.

Moreover, access points 110 provide RSS values 312 to location computer 124 via a network, such as the Internet. After receiving RSS values 312, location computer 124 selects a subset 314 of RSS values from a subset of access points 110. Note that location computer 124 may not process RSS values for every packet. The actual number of RSS values processed can be adjusted by varying the sampling rate of the RSS values (such as one sample per second).

Next, location computer 124 calculates pairwise distance estimates 316 of a location of electronic device 112 in the environment based on predefined locations of the subset of the access points 110, one or more differences of pairs of RSS values in subset 314 of the RSS values and a predetermined path-loss factor in the environment. Furthermore, location computer 124 determines location 318 of electronic device 112 in the environment based on pairwise distance estimates 316.

In an exemplary embodiment, the location of the electronic device is determined using a calibration-free Wi-Fi location-determination technique and RSS information. In contrast with RSS fingerprinting technique, this positioning or location-determination technique does not use a so-called 'map-and-matching' process, and therefore may not use an offline calibration. Moreover, the location-determination technique may not use absolute RSS values. Instead, pairwise RSS differential values are used (as identified based on sub-regions in an environment, such as those specified by a Voronoi tessellation). This approach may provide robustness against radio-frequency variance of different portable electronic devices. Furthermore, the location-determination technique may calculate a location estimate based on an RSS vector collected in real-time (e.g., the RSS values reported by access points every 100 ms, 0.5 s, 1 s, 2 s, 5 s or 10 s). Consequently, the computational complexity of the location-determination technique may be independent of the physical size of the environment or coverage area.

In the discussion that follows, Voronoi tessellation is used as an illustration of a technique for sub-dividing the environment into sub-regions. Note that 'Voronoi tessellation' indicates a partitioning of a plane into regions (which are sometimes referred to as 'sub-regions') based on the 'closeness' to points in a specific subset of the plane. Moreover, 'Voronoi cell centers' are a set of points whose positions or locations are predefined. Furthermore, a 'Voronoi cell' is, for a given cell center, a corresponding region that includes all points closer to the given cell center than to any other. These regions are called 'Voronoi cells.' In addition, a 'Voronoi edge' includes a line segment, half line, and infinite line that is a boundary of Voronoi cells, and a Voronoi cell is a 'Voronoi neighbor' cell of another Voronoi cell if they share a common Voronoi edge.

In addition, note that Voronoi tessellation may not be required for the location-determination technique to work. However, Voronoi tessellation can identify the 'most geographically relevant' neighbors of a specific access point. In general, the 'geographical relevance' of two access points may not only depend on the distance between these two access points, but may also depend on the physical distribution of the access points in the plane. As a simple example, assume that that Voronoi cells C1-C4 are arranged sequentially and collinearly along a direction. In this example, suppose the distance between access points C2 and C1 is larger than the distance between access points C2 and C4 and the distance between access points C2 and C3. If access point C2 has the strongest RSS value, according to the Voronoi tessellation access points C1 and C3 (instead of access points C3 and C4) may be selected as the Voronoi neighbors of access point C2. In this case, access point C1 may be superior to access point C4 for determining the location because it contains additional 'directional' information of the electronic device with respect to access point C2. (In turn, access point C4 contains exactly the same 'directional' information as access point C3 with respect to access point C2.)

Figure 4:
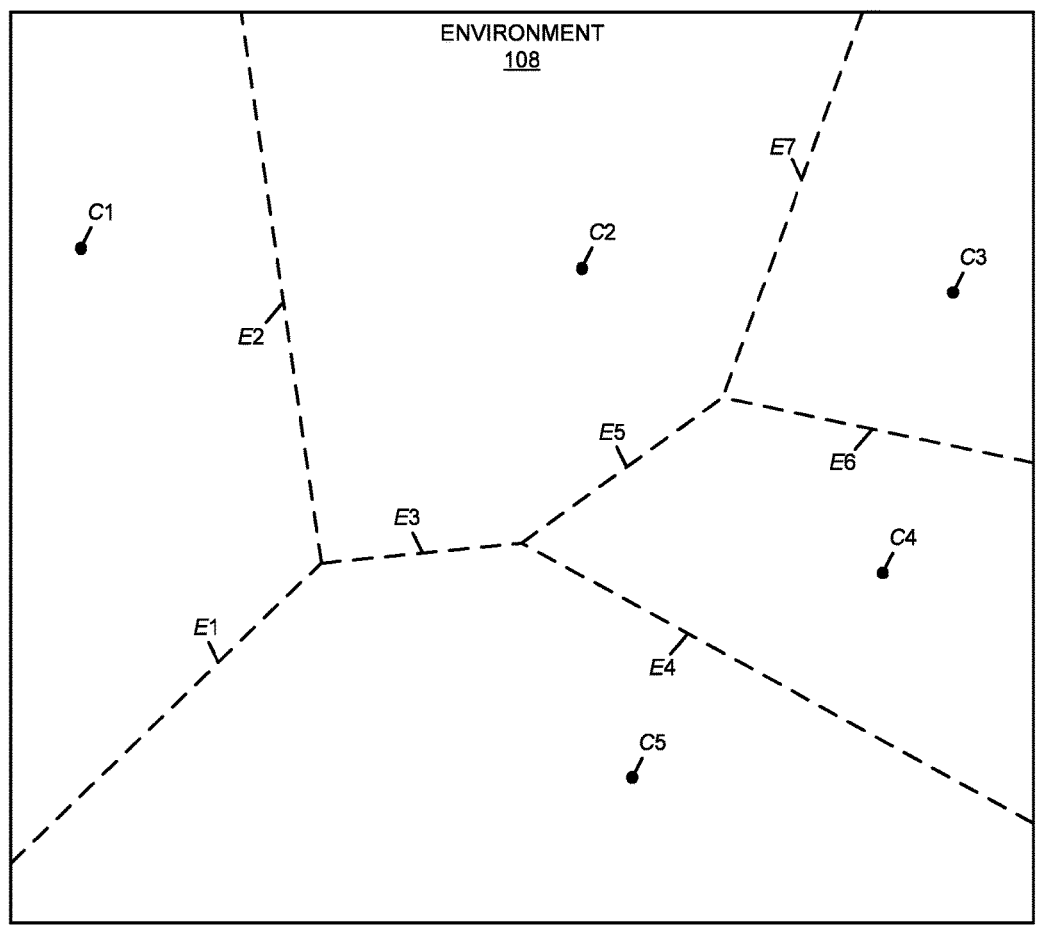
FIG. 4 is a drawing illustrating Voronoi tessellation of an environment in accordance with an embodiment of the present disclosure.

FIG. 4 presents a drawing illustrating Voronoi tessellation 400 of environment 108 in accordance with some embodiments. In FIG. 4, the plane of environment 108 is partitioned into five Voronoi cells, and their Voronoi cell centers are denoted as C1 to C5 respectively (however, sometimes Voronoi cells are also referred to as Ci). Thus, Voronoi tessellation 400 includes seven Voronoi edges, i.e., E1 to E7. In particular, Voronoi cell C1 has Voronoi neighbors C2 and C5; Voronoi cell C2 has Voronoi neighbors C1, C3, C4 and C5; Voronoi cell C3 has Voronoi neighbors C2 and C4; Voronoi cell C4 has Voronoi neighbors C2, C3; and C5, and Voronoi cell C5 has Voronoi neighbors C1, C2 and C4.

In a specific deployment venue or environment, the coordinates of all the access points are available (e.g., to the controller). Thus, the locations of the access points are predefined. Moreover, the location computer (which may be a server) periodically obtains channel-assignment information of all the access points from the controller. The access points that are operating on the same channel can then be grouped together to form a Voronoi access-point group. For a given Voronoi access-point group, a Voronoi tessellation may be generated by the location computer using each access point in the given Voronoi access-point group as a Voronoi cell center. This Voronoi tessellation may then be associated with this Voronoi access-point group and saved in a computer-readable data structure.

An access point may: capture and analyze Wi-Fi packets transmitted by a portable electronic device within the coverage area in the environment; and communicate with both its designated location instance in the location computer and a system manager (such as a controller) via a network (such as the Internet). (Note that, in some embodiments controller 122 and location computer 124 in FIG. 1 can co-exist or may be implemented in the same machine.) In addition, the given access point may: obtain its operational configuration from the system manager using configuration software; and include scanner software that sends captured scanning reports (real-time location service or RTLS' reports with RSS values) to a collator in the location instance. (Note that, depending on whether the positioning request is initiated by the user or the location computer, RTLS reports may be different from 'footfall reports.' In particular, RTLS reports are used to locate the users who want to know their positions and who send out a positioning request. In contrast, footfall reports are used to locate all the electronic devices within the coverage area, i.e., the associated users are located passively.)

Figure 5:
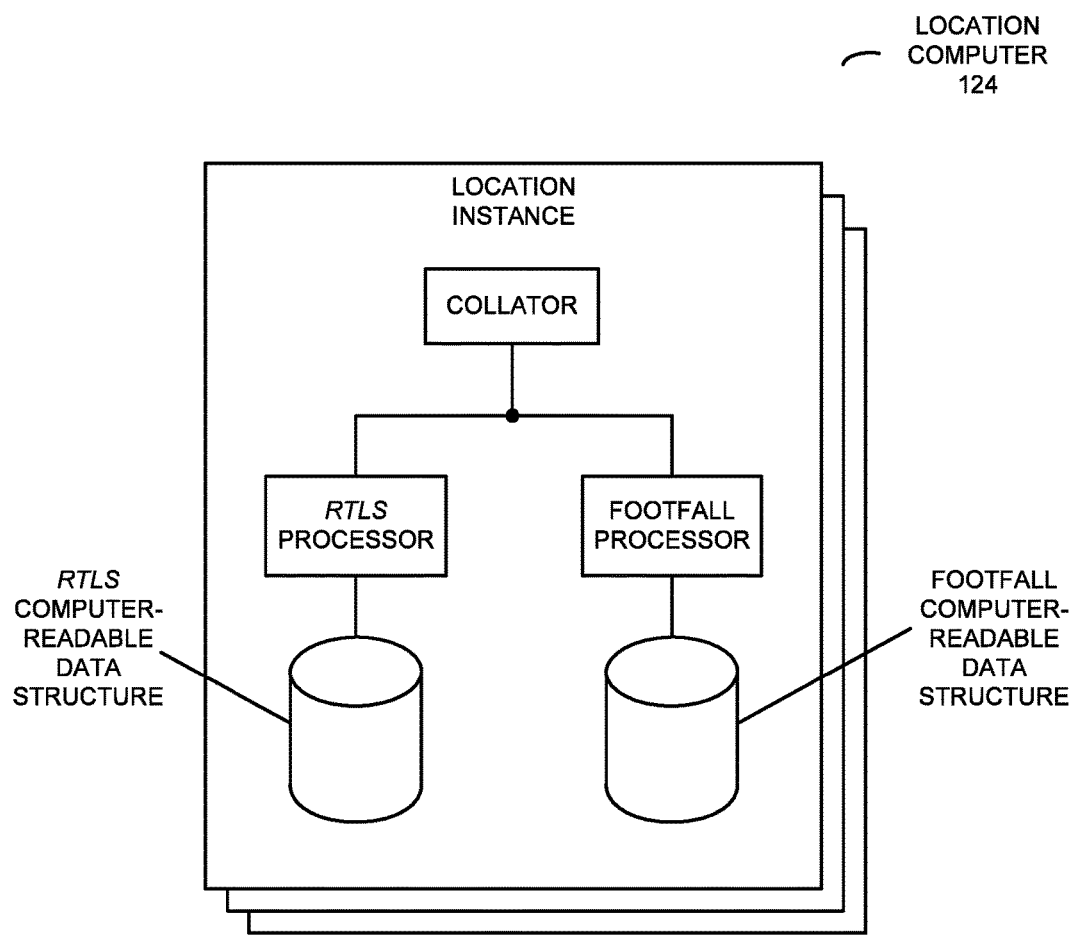
FIG. 5 is a block diagram illustrating a location computer in FIG. 1 in accordance with an embodiment of the present disclosure.

Moreover, a given location computer may be able to host up to N location instances. Note that a 'location instance' is a logical computation unit that handles the position calculation for a physical venue. Each location instance may connect with up to X access points that are installed in a single LBS site or environment. As shown in FIG. 5, which presents a block diagram of location computer 124 in accordance with some embodiments, a given location instance may include a collator that: receives individual scanning reports (i.e., RTLS or footfall reports) from access points, organizes the reports based on the portable electronic device media-access-control (MAC) addresses into observation metrics (OMs), and then route the OMs to the relevant processor(s). (More general, each of access points 110 and electronic device 112 needs a unique identifier. Consequently, other types of identifiers than a MAC address may be used.) Furthermore, the given location instance may include: an RTLS processor that computes the location of the portable electronic device and stores the relative coordinates in an RTLS computer-readable data structure (such as a database); and a footfall processor that computes the location of the portable electronic device and stores the relative coordinates into a footfall computer-readable data structure (such as a database). Note that the RTLS processor and the footfall processor may be virtual machines. More generally, the RTLS processor and the footfall processor represent computation units in a location instance.

Furthermore, the system manager may be hosted on a separate computer or server from the location computer. (Alternatively, as noted above, the system manager and the location computer may be hosted on the same computer or server.) It may maintain and manage the location computer(s) and their location instances for the wireless positioning system.

Additionally, an OM may include the scans the access points receive based on Wi-Fi packets transmitted by portable electronic devices within the coverage area. (As noted previously, other types of communication than packets may be used so long as RSS values can be extracted.) The RSS information carried by these Wi-Fi packets may be packaged into scanning reports and sent to the collator in a location instance. (As noted previously, the RSS value is not included or encoded in a packet. Instead, the RSS value may be extracted by the receiver from the radio-frequency waveform that carries a packet.) Then, the collator may: receive the individual scanning reports from the access points, organize them by portable electronic device MAC addresses into observation metrics (OMs) and then route them to the relevant processors. FIG. 6 presents a block diagram of data structure 600 that stores an OM in accordance with some embodiments. This data structure includes a list of the MAC addresses and RSS values of the Wi-Fi access points detected during a scan.

Figure 7:
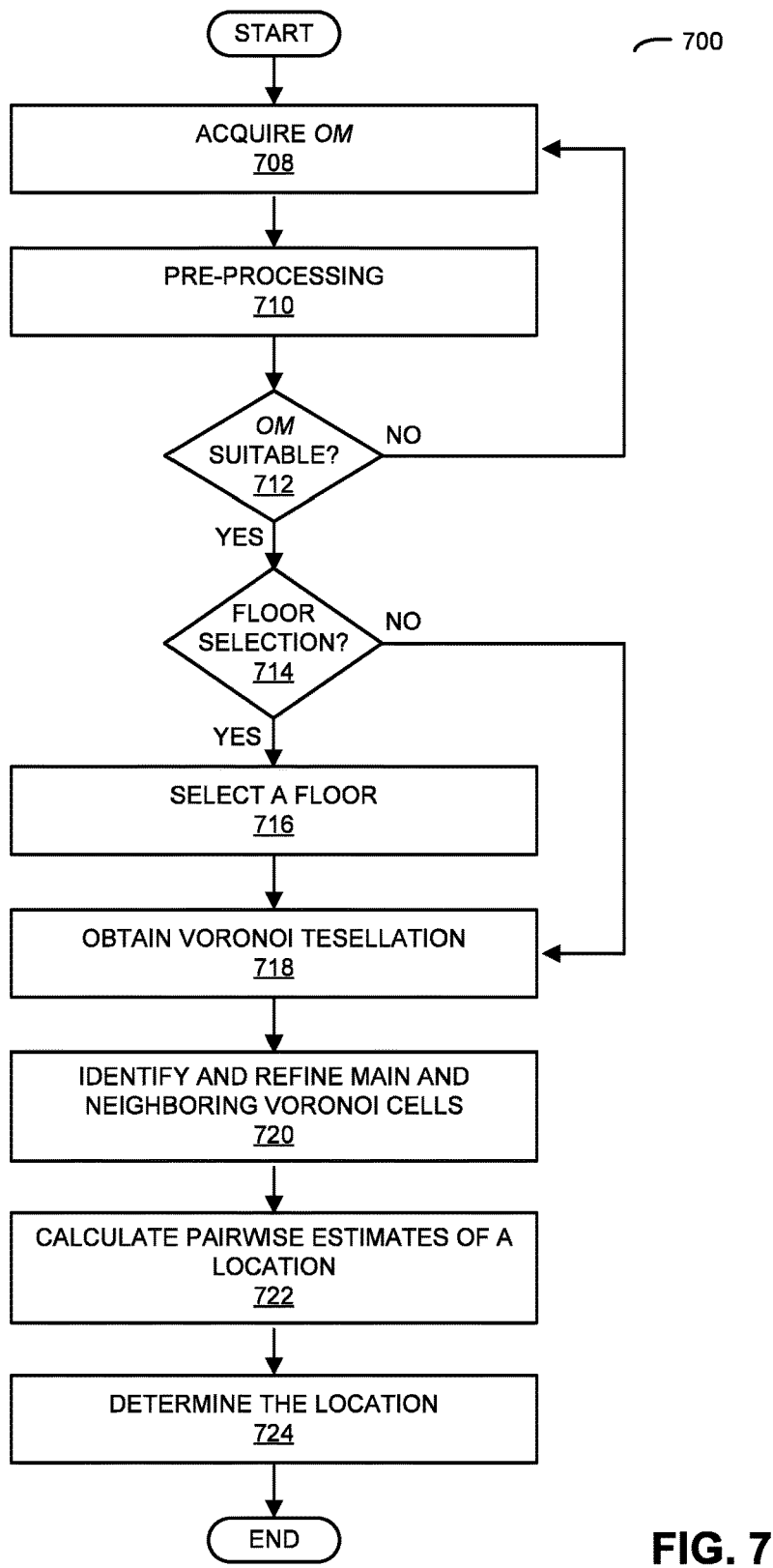
FIG. 7 is a flow diagram illustrating a method for determining a location of an electronic device in FIG. 1 in accordance with an embodiment of the present disclosure.

As noted previously, the location-determination technique may be performed by the RTLS and footfall processor(s). This location-determination technique is shown in FIG. 7, which presents a flow diagram illustrating a method 700 for determining a location of the electronic device in FIG. 1 (such as electronic device 112 in FIG. 1) in accordance with some embodiments. During this method, one or more processors may acquire an OM (operation 708) and may perform pre-processing (operation 710). Because of the fluctuating nature of Wi-Fi signals, the OMs generated by the collator may have a large dynamic range and thus in some embodiments are not directly used for positioning. The pre-processing removes the outlier values and filters or reduces the excessive fluctuations of the RSS values or signals in an OM.

Then, the one or more processors may perform an OM sanity check to assess OM suitability (operation 712). This check may determine that: the OM is not outdated (such as an OM that has a timestamp within the last 60 s); the largest RSS value in the OM is larger than a predefined threshold (e.g., RSS values may typically be between −100 and −30 dBm, but the largest RSS value may need to be larger than −75 dBm); and the number of RSS values in this OM is larger than a predefined threshold (while the number of RSS values may depend on the environment, if there are fewer than three RSS values in the OM, the coverage may be too spare and the location-determination problem may be underdetermined). If the OM satisfies these requirements, it can be used for positioning. Note that the RSS value typically follows a log-normal distribution more closely when the RSS value is relatively strong (e.g., above −75 dBm in a 2.4

GHz band). Therefore, the predefined (RSS) threshold (e.g., −75 dBm) may be used to remove an unreliable OM that contains only weak RSS values. In addition, in general the location-determination technique uses at least N+1 access points for the pair-wise position calculation. Another predefined threshold (for the minimum number of access points in an OM) removes OMs with less than N+1 access points.

Moreover, the one or more processors may determine whether floor selection is necessary (operation 714) and, if yes, may select a floor (operation 716). In a multiple-floor building, floor switching is possible only when the portable electronic devices (and, in particular, the person who is carrying them) are close to (at) certain facilities, such as: lifts, escalators, and stairs. Consequently, this operation may check the previous estimated location of a specific electronic device and determine whether it is necessary to trigger the floor-selection subroutine. The floor-selection subroutine is shown in FIG. 8, which presents a flow diagram illustrating a method 800 for determining a floor that contains the electronic device in FIG. 1 (such as electronic device 112 in FIG. 1). This method may use a floor-selection decision window (W), such as W equal to four. Note that the accuracy of the floor prediction may be improved when the floor-selection subroutine make a floor-selection decision based on more than one floor-detection result.

During method 800, the latest floor-detection result may be obtained based on the current OM. In particular, the floor-detection result may equal the floor where the access point with the strongest RSS value in the OM is located. When a new floor-detection result is available, it is queued into the floor-selection decision window, and the oldest floor-detection result in the floor-selection decision window is queued out. If all the values in the floor-selection decision window are the same, the value may be output as the final floor-selection decision. However, if the values are not consistent, the floor-selection subroutine may wait for a new OM and method 800 may be repeated. For example, if all the values are floor two, floor two may be output as the final floor-selection decision.

Referring back to FIG. 7, next the one or more processors may generate a Voronoi tessellation or may load a predetermined Voronoi tessellation, i.e., the one or more processors may obtain a Voronoi tessellation (operation 718). For example, in an environment with ten access points (i.e., AP1 to AP10), AP1 to AP5 (access-point group I) are operating on channel 1, whereas AP6 to AP10 (access-point group II) are operating on channel 6. Suppose a particular portable electronic device within the coverage area is operating on channel 1, and is detected by the access points in access-point group I (i.e., the OM only contains access points from access-point group I). The location-determination technique then checks the data structure to determine if a Voronoi tessellation corresponding to access-point group I already exists. If yes, the Voronoi tessellation is loaded for subsequent use. Otherwise, a Voronoi tessellation is generated and saved in the data structure.

Furthermore, the one or more processors may determine the main Voronoi cell and its Voronoi neighbors (operation 720). Using the same example, we assume that Voronoi tessellation 400 (FIG. 4) is used, and that in the OM the RSS values for AP1 to AP 5 are in descending order, i.e., the RSS value for AP1 is greater than the RSS value for AP2, which is greater than the RSS value for AP3, which is greater than the RSS value for AP4, and which is greater than the RSS value for AP5. Because AP1 has the strongest RSS value in the OM, Voronoi cell C1 is the main Voronoi cell, and according to Voronoi tessellation 400 (FIG. 4), it has two Voronoi neighbors, i.e., Voronoi cell C2 and Voronoi cell C5. Note that Voronoi tessellation 400 (FIG. 4) is therefore used to identify neighboring Voronoi cells (or neighboring sub-regions) and, thus, neighboring access points.

Additionally, the one or more processors may refine the identified Voronoi neighbor cells (operation 720). This operation may remove a Voronoi neighbor cell (starting from the Voronoi neighbor whose corresponding access point has the smallest RSS value) if the difference of the RSS values between its corresponding access point and the access point corresponding to the main Voronoi cell is larger than a certain predefined threshold (such as 5 dB). (As noted previously, 5 dB may be used to exclude RSS values that do not follow a log-normal distribution. A larger value for the predefined threshold, such as 10 dB, may be used as the average distance between access points increases.) However, at least two Voronoi neighbors may be kept even if they do not satisfy this threshold requirement.

The one or more processors may calculate pairwise estimates of the location (operation 722) based on differential RSS values. Using the preceding example, the OM includes RSS values from or corresponding to a main Voronoi cell C1, and two refined Voronoi neighbors C2 and C5. The RSS values for AP1, AP2, and AP5 are denoted as RSS1, RSS2, and RSS5, respectively. In addition, the coordinates or predefined locations of AP1, AP2, and AP5 are given as (x1, y1), (x2, y2), and (x5, y5), respectively. First, the one or more processors calculate the pairwise position or location between Voronoi cells C1 and C2. Assuming a log-normal distribution of the RSS values, then $$RSS1 = A + 10 \cdot n \cdot \log(d1) \tag{1}$$

and $$RSS2 = A + 10 \cdot n \cdot \log(d2), \tag{2}$$

where A is a constant, n denotes a predetermined path-loss factor, and d1 and d2 denote the distances from the portable electronic device to AP1 and AP2, respectively. Subtracting Eqn. 2 from Eqn. 1 and rearranging yields $$\alpha = \frac{d1}{d2} = 10^{\frac{(RSS1-RSS2)}{10 \cdot n}}. \tag{3}$$

The coordinate of the pairwise position or location of the portable electronic device based on Voronoi cells C1 and C2 is denoted as (x, y). Then, x and y satisfy $$(x-x1)^2 + (y-y1)^2 = \alpha^2 \cdot [(x-x2)^2 + (y-y2)^2]. \tag{4}$$

Similarly, using Voronoi cells C1 and C5, then x and y also satisfy $$(x-x1)^2 + (y-y1)^2 = \beta^2 \cdot [(x-x5)^2 + (y-y5)^2], \tag{5}$$

where $$\beta = \frac{d1}{d5} = 10^{\frac{(RSS1-RSS5)}{10 \cdot n}}. \tag{6}$$

Note that when a different model of the portable electronic device is used, a constant offset Δ in the RSS value may be introduced. Consequently, Eqns. 1 and 2 can be written as $$RSS1' = A + \Delta + 10 \cdot n \cdot \log(d1) \tag{7}$$

and $$RSS2' = A + \Delta + 10 \cdot n \cdot \log(d2). \tag{8}$$

However, α and β remain unchanged. For example, Eqn. 3 can be written as $$\alpha = \frac{d1}{d2} = 10^{\frac{(RSS1-RSS2)}{10 \cdot n}} = 10^{\frac{(RSS1'-RSS2')}{10 \cdot n}}. \quad (9)$$

Therefore, changing the model of the portable electronic device in the location-determination technique may not affect the result of the location estimate.

Finally, the one or more processors combine the pairwise location estimates and determine the location (operation 724). In particular, Eqns. 4 and 5 can be solved using a regression technique (such as least-squares regression) to calculate the location of the portable electronic device.

Note that in some embodiments information about the physical environments may be used to simplify the preceding calculation. In addition, note that the preceding calculation can be extended to determine the location in three dimensions (instead of in a plane, which is merely used as an illustration).

Thus, the location-determination technique may use Voronoi tessellation to find the 'dominance region' of each access point, and its most relevant neighboring access-points for position calculation. This Voronoi tessellation may be dynamically generated by the location computer based on the channel assignments of the access points. Moreover, the location-determination technique may not require any offline calibration, which may allow fast and cost-efficient deployment. Furthermore, the location-determination technique may use pairwise differential RSS values instead of absolute RSS values, which may make the location-determination technique robust against the radio-frequency variance of different portable-electronic-device models. Additionally, the computational complexity of the location-determination technique may be independent of the scale of the coverage area, thus making it suitable for deployment in large venues or environments.

We now describe embodiments of the access points, the electronic device and the location computer. FIG. 9 presents a block diagram illustrating an electronic device 900 (such as location computer 124 in FIG. 1) according to some embodiments. This electronic device includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program module 922 or operating system 924), which may be executed by processing subsystem 910. Note that the one or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more optional antennas 920. (While FIG. 9 includes the one or more optional antennas 920, in some embodiments electronic device 900 includes one or more nodes, such as optional node 908, e.g., a pad, which can be coupled to the one or more optional antennas 920. Thus, electronic device 900 may or may not include the one or more optional antennas 920.) For example, networking subsystem 914 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a subnotebook/netbook, a server, a tablet computer, a smartphone, a cellular telephone, a consumer-electronic device, a portable computing device, an access point, a controller, a router, a switch, communication equipment, test equipment, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments, some or all of a given subsystem or component can be integrated into one or more of the other subsystems or component(s) in electronic device 900. For example, in some embodiments program module 922 is included in operating system 924.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 914, such as a radio. Moreover, the integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e g, determining if the received signal comprises an advertising frame or determining an RSS value, etc.)

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the location-determination technique may be implemented using program module 922, operating system 924 (such as a driver for interface circuit 918), or in firmware in interface circuit 918. Alternatively or additionally, at least some of the operations in the location-determination technique may be implemented in a physical layer, such as hardware in interface circuit 918.

Moreover, while the preceding discussion illustrated the determination of the location of the electronic device using a central location computer, in other embodiments at least some of the operations in the location-determination technique are performed in a distributed manner by one or more electronic devices, such as access points 110 in FIG. 1.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
one or more nodes;
an interface circuit, coupled to the one or more nodes, configured to communicate with access points via a network;
a processor coupled to the interface circuit; and
memory, coupled to the processor, that stores program instructions, wherein, when executed by the processor, the program instructions cause the computer to perform one or more operations comprising:
receiving, from the one or more nodes, received-signal-strength (RSS) values associated with the access points in sub-regions of an environment, wherein the RSS values characterize wireless communication between the access points and an electronic device in the environment;
selecting a subset of the RSS values from a subset of the access points, wherein the subset of the RSS values comprises a largest RSS value associated with a sub-region and at least N RSS values associated with one or more access points in neighboring sub-regions, and wherein N is an integer;
calculating pairwise distance estimates of a location of the electronic device in the environment based on predefined locations of the subset of the access points, one or more differences of pairs of RSS values in the subset of the RSS values and a predetermined path-loss factor in the environment, wherein a given pair of RSS values comprises a largest RSS value and one of the at least N RSS values; and determining the location of the electronic device in the environment based on the pairwise distance estimates.

2. The computer of claim 1, wherein each sub-region comprises one of the access points.

3. The computer of claim 1, wherein N is two.

4. The computer of claim 1, wherein the environment comprises a building; and wherein the selecting involves identifying access points that are located on a common floor in the building.

5. The computer of claim 1, wherein the sub-regions comprise Voronoi cells; and wherein a given access point is located at a center of a given Voronoi cell.

6. The computer of claim 1, wherein the one or more operations comprise sub-dividing the environment into the sub-regions.

7. The computer of claim 1, wherein determining the location of the electronic device comprises a regression technique and a set of equations that comprise the pairwise distance estimates, the predefined locations, parameters corresponding to the one or more differences of the pairs of RSS values and the predetermined path-loss factor.

8. The computer of claim 1, wherein the location of the electronic device is determined without calibration for one of: coverage of the access points in the environment, and access-point variability.

9. The computer of claim 1, wherein the wireless communication is associated with a common channel.

10. The computer of claim 1, wherein a difference between the largest RSS value and a given one of at least the N RSS values is less than a threshold value.

11. The computer of claim 1, wherein a computation complexity of the determination of the location of the electronic device is independent of a size of the environment and coverage of the access points in the environment.

12. A non-transitory computer-readable storage medium for use in conjunction with a computer, the computer-readable storage medium storing program instructions, wherein, when executed by the computer, the program instructions cause the computer to determine a location of an electronic device in an environment by performing one or more operations comprising:

receiving received-signal-strength (RSS) values associated with access points in sub-regions of an environment, wherein the RSS values characterize wireless communication between the access points and an electronic device in the environment;

selecting a subset of the RSS values from a subset of the access points, wherein the subset of the RSS values comprises a largest RSS value associated with a sub-region and at least N RSS values associated with one or more access points in neighboring sub-regions, and wherein N is an integer;

calculating pairwise distance estimates of a location of the electronic device in the environment based on predefined locations of the subset of the access points, one or more differences of pairs of RSS values in the subset of the RSS values and a predetermined path-loss factor in the environment, wherein a given pair of RSS values comprises a largest RSS value and one of the at least N RSS values; and determining the location of the electronic device in the environment based on the pairwise distance estimates.

13. The computer-readable storage medium of claim 12, wherein the environment comprises a building; and wherein the selecting involves identifying access points that are located on a common floor in the building.

14. The computer-readable storage medium of claim 12, wherein the one or more operations comprise sub-dividing the environment into the sub-regions.

15. The computer-readable storage medium of claim 12, wherein the location of the electronic device is determined without calibration for one of: coverage of the access points in the environment, and access-point variability.

16. The computer-readable storage medium of claim 12, wherein the wireless communication is associated with a common channel.

17. The computer-readable storage medium of claim 12, wherein a computation complexity of the determination of the location of the electronic device is independent of a size of the environment and coverage of the access points in the environment.

18. A method for determining a location of an electronic device in an environment, wherein the method comprises:

by a computer:

receiving received-signal-strength (RSS) values associated with access points in sub-regions of an environment, wherein the RSS values characterize wireless communication between the access points and an electronic device in the environment;

selecting a subset of the RSS values from a subset of the access points, wherein the subset of the RSS values comprises a largest RSS value associated with a sub-region and at least N RSS values associated with one or more access points in neighboring sub-regions, wherein N is an integer;

calculating pairwise distance estimates of a location of the electronic device in the environment based on predefined locations of the subset of the access points, one or more differences of pairs of RSS values in the subset of the RSS values and a predetermined path-loss factor in the environment, wherein a given pair of RSS values comprises a largest RSS value and one of the at least N RSS values; and determining the location of the electronic device in the environment based on the pairwise distance estimates.

19. The method of claim 18, wherein the location of the electronic device is determined without calibration for one of: coverage of the access points in the environment, and access-point variability.

20. The method of claim 18, wherein a computation complexity of the determination of the location of the electronic device is independent of a size of the environment and coverage of the access points in the environment.

21. A computer, comprising:

one or more nodes;

an interface circuit, coupled to the one or more nodes, configured to communicate with access points via a network;

a processor coupled to the interface circuit; and memory, coupled to the processor, that stores program instructions, wherein, when executed by the processor, the program instructions cause the computer to perform one or more operations comprising:

determining a location of an electronic device in an environment based on pairwise distance estimates that are calculated using predefined locations of access points in the environment, one or more differences of pairs of received-signal-strength (RSS) values from the access points and a predetermined path-loss factor in the environment, wherein the RSS values characterize wireless communication between the access points and the electronic device, and wherein the RSS values in a given pair of RSS values are associated with two different access points.

22. The computer of claim 21, wherein a computation complexity of the determination of the location of the electronic device is independent of a size of the environment and coverage of the access points in the environment.

* * * * *